(12) United States Patent
Matsuzaki et al.

(10) Patent No.: US 10,047,238 B2
(45) Date of Patent: Aug. 14, 2018

(54) INK SET AND RECORDING METHOD (71) Applicant: Seiko Epson Corporation, Tokyo (JP)

(72) Inventors: Akiko Matsuzaki, Matsumoto (JP); Takayoshi Kagata, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/372,744

(22) Filed: Dec. 8, 2016

(65) Prior Publication Data

US 2017/0166768 A1 Jun. 15, 2017

(30) Foreign Application Priority Data

Dec. 11, 2015 (JP) .................................. 2015-242615
Nov. 11, 2016 (JP) .................................. 2016-220243

(51) Int. Cl.
*C09D 11/54* (2014.01)
*C09D 11/03* (2014.01)
*C09D 11/10* (2014.01)

(52) U.S. Cl.
CPC .............. *C09D 11/54* (2013.01); *C09D 11/03* (2013.01); *C09D 11/10* (2013.01)

(58) Field of Classification Search
CPC ............ G03G 9/08755; B41M 5/0017; B41M 7/0018; C09D 11/12
See application file for complete search history.

(56) References Cited

U.S. PATENT DOCUMENTS

| | | | | |
|---|---|---|---|---|
| 4,066,810 A | * | 1/1978 | Kosaka | B41M 5/0356 101/150 |
| 6,848,781 B2 | | 2/2005 | Ogino et al. | |
| 7,291,361 B2 | | 11/2007 | Ogino et al. | |
| 2006/0166122 A1 | * | 7/2006 | Patel | G03G 9/0804 430/110.2 |
| 2008/0248415 A1 | * | 10/2008 | Maezawa | G03G 9/081 430/112 |
| 2010/0084610 A1 | * | 4/2010 | Iftime | C09K 11/02 252/301.35 |
| 2010/0297369 A1 | * | 11/2010 | Tohmatsu | B41M 5/392 428/32.81 |
| 2012/0040281 A1 | * | 2/2012 | Wang | B41M 5/0256 430/48 |
| 2013/0307899 A1 | * | 11/2013 | Saito | C09D 7/1225 347/21 |
| 2014/0342280 A1 | * | 11/2014 | Farrugia | C08G 63/199 430/108.4 |
| 2015/0024134 A1 | | 1/2015 | Hayashi et al. | |

FOREIGN PATENT DOCUMENTS

| | | |
|---|---|---|
| JP | 2004-122478 A | 4/2004 |
| JP | 2006-160850 A | 6/2006 |
| JP | 4366164 B2 | 11/2009 |
| JP | 5344137 B2 | 11/2013 |
| JP | 2015-020324 A | 2/2015 |

* cited by examiner

*Primary Examiner* — John P Zimmermann

(74) *Attorney, Agent, or Firm* — Harness, Dickey & Pierce, P.L.C.

(57) ABSTRACT

An ink set includes two ink compositions containing resin and wax separately, with the resin in one and the wax in the other, or an ink composition containing resin and wax together as well as a coagulant solution containing a coagulant for a component of the ink composition(s). The resin and the wax include a resin and a wax wherein the resin has higher aggregability than the wax.

18 Claims, 1 Drawing Sheet

INK SET AND RECORDING METHOD

BACKGROUND

1. Technical Field

The present invention relates to an ink set and a recording method.

2. Related Art

Ink jet recording methods, which allow the user to record high-definition images with relatively simple equipment, have been rapidly advancing in various fields. In particular, stable production of high-quality recordings has been the focus of various studies.

For example, JP-A-2006-160850 is intended to provide an ink, an ink jet recording method, and a recording advantageous in that with respect to images formed using a two-liquid system, a coloring material does not peel off even when the recorded area is rubbed. The publication discloses a water-soluble ink to be used with a reaction solution containing a reactive component that reacts with the water-soluble ink to make the ink aggregate or gel, along with an ink jet recording method and a recording. The water-soluble ink incorporates water, a water-soluble organic solvent, a pigment, and two or more water-soluble polymers mutually different at least in terms of hydrophilicity. At least one of the polymers has a critical coagulation concentration twice or more that of the other polymer(s) and has film-forming properties.

Recordings formed by applying a reaction solution and an ink composition according to JP-A-2006-160850 to a substrate may have insufficient abrasion resistance. That is, the "critical coagulation concentration" according to this publication is a measure of aggregability at 60 minutes after the mixing of the reaction solution and the polymer and does not represent the reactivity during the reaction period, the time required from the contact of the reaction solution and the ink composition to fixation. Furthermore, the "critical aggregation concentration" correlates little with this reactivity because it depends on factors such as the post-reaction structure and diameter of the particles. It is therefore difficult to ensure a superior level of abrasion resistance by making this "critical coagulation concentration" of one polymer twice or more that of the other(s). Worse yet, such an ink composition, when used with a discharge head for ink jet compositions, can cause the discharge head to clog because the water in the ink composition evaporates making the water-soluble polymer(s) in the ink composition with higher hydrophobicity more soluble or film-forming.

SUMMARY

An advantage of some aspects of the invention is that an ink set is provided that offers superior abrasion resistance when a coagulant solution and an ink composition are applied to a substrate for improved image quality.

After extensive research to solve the above problems, the inventors found that when a coagulant solution and an ink composition are applied to a substrate for improved image quality, superior abrasion resistance is achieved through the use of an ink set that includes one or two or more ink compositions and a coagulant solution with resin and wax in the same or different ink compositions, the resin having higher aggregability than the wax, and completed the invention. The inventors also found that such an ink set offers superior abrasion resistance and glossiness, and completed the invention.

An aspect of the invention is an ink set that includes one or two or more ink compositions and a coagulant solution. Resin and wax are contained in the same ink composition together or in different ink compositions separately, and the coagulant solution contains a coagulant for the ink composition(s). The resin has higher aggregability than the wax. A possible but not the only reason why such an ink set solves the problems intended in the invention is as follows. After the adhesion of the coagulant solution and the ink composition(s) (hereinafter collectively referred to as "the ink stuff") to a substrate, the resin, having high aggregability compared with the wax, aggregates with the coagulant in the coagulant solution within the adhering ink stuff and settles down toward the substrate. The precipitate makes the recording highly resistant to abrasion by strengthening the bond between the coating formed by the ink composition(s) and the substrate in the recording. The wax, having low aggregability compared with the resin, remains on the surface side of the adhering ink stuff (the side opposite the substrate) after the ink stuff reaches the substrate. The wax on the surface side of the ink stuff makes the recording highly resistant to abrasion and glossy by forming a uniform coating on this side. Furthermore, the wax also exists on the substrate side of the adhering ink stuff, although in a relatively small amount, and this fraction of wax joins the precipitate. As a result, the precipitate strengthens the bond between the coating formed by the ink composition(s) and the substrate more than would with the resin alone. Likewise, a relatively small amount of resin present on the surface side of the adhering ink stuff enhances the film-forming properties of the ink stuff.

The ink set according to an aspect of the invention preferably includes one or two or more ink compositions selected from the group consisting of a colored ink composition, which is an ink composition further containing a coloring material, and a clear ink composition, which is substantially free of coloring materials. More preferably, the ink set includes the colored ink composition and the clear ink composition with the resin in the colored one and the wax in the clear one. It is more preferred that the ink set include at least the colored ink composition with the coloring material therein incorporating one or two or more pigments selected from the group consisting of self-dispersible pigments and resin-dispersed pigments. It is preferred that two or more resins with different degrees of aggregability be used. The resin and the wax preferably satisfy relational expression (1):

$$0.1 \text{ mL} \leq (W-J) \leq 3.0 \text{ mL} \tag{1}$$

(where J represents the minimum aggregation volume (mL) of the resin, and W represents the minimum aggregation volume (mL) of the wax). It is preferred that one or two or more coagulants selected from the group consisting of organic acids, polyvalent metal salts, and cationic compounds be used. The ink composition(s) is preferably for use in ink jetting. Preferably, the ink composition(s) contains the resin and the wax such that the resin and the wax each independently represents, on a solid basis, 0.5% by mass or more and 15% by mass or less of the total amount of the ink composition(s).

A recording method according to an aspect of the invention includes applying the ink composition(s) in such an ink set to a substrate, and further includes applying a coagulant solution to the substrate. Preferably, the ink set includes colored and clear ink compositions. The application of the ink composition(s) is preferably a wet-on-wet application process. An ink set according to an aspect of the invention preferably has a weighted average aggregability for the resins in the ink composition(s) higher than that for the waxes in the ink composition(s).

BRIEF DESCRIPTION OF THE DRAWINGS

The invention will be described with reference to the accompanying drawing.

DESCRIPTION OF EXEMPLARY EMBODIMENTS

Figure 1:
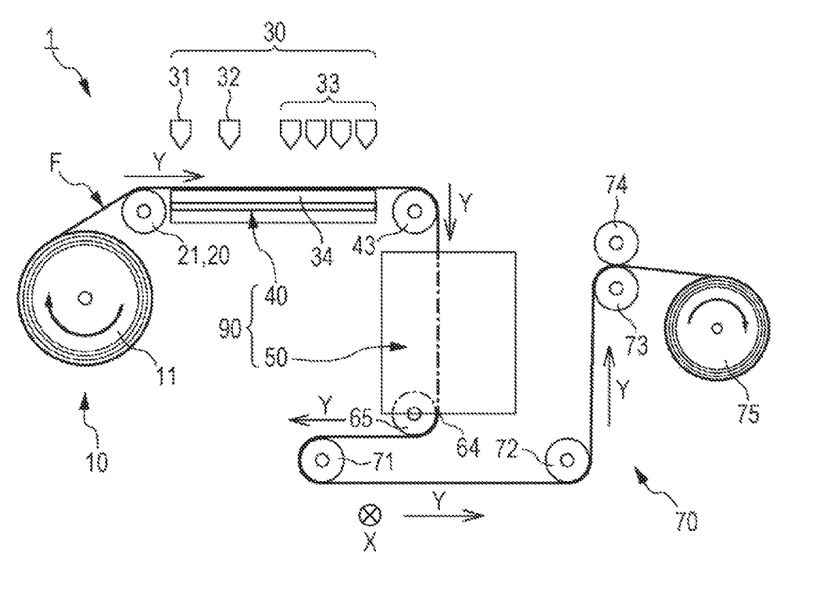
The FIGURE is a side view that illustrates the entire schematic of an example of an ink jet recorder that can be used in an inventive embodiment.

The following describes some embodiments of the invention (hereinafter each referred to as an "inventive embodiment") in detail while referring to the drawing as necessary. No aspect of the invention is limited to the inventive embodiments, and various modifications can be made without departing from the scope of that aspect of the invention. The positional relationships such as above, below, left, and right are based on the positional relationships illustrated in the drawing unless otherwise specified. The relative dimensions in the drawing are not limited to the illustrated ratios.

Ink Set

An ink set according to an inventive embodiment includes one or two or more ink compositions and a coagulant solution. Resin and wax are contained in the same ink composition together or in different ink compositions separately, and the coagulant solution contains a coagulant. The resin has higher aggregability than the wax. Ink sets according to this embodiment offer superior abrasion resistance, glossiness, and image quality (uneven solid fills) when the coagulant solution and the ink composition(s) are applied to a substrate.

Ink Composition(s)

An ink set according to this embodiment includes one or two or more ink compositions. The ink set may include one ink composition containing both the resin and the wax or separate ink compositions, with the resin in one and the wax in another. The ink composition(s) may optionally contain other components such as coloring materials, surfactants, solvents, and water. It is preferred that the ink composition(s) be aqueous ink composition(s), in which the resin has been dispersed in water. The use of such ink composition(s) tends to result in further improved abrasion resistance of the resulting recordings.

In this embodiment, the ink set preferably includes one or two or more ink compositions selected from the group consisting of colored and clear ink compositions. A "colored ink composition" is an ink composition that further contains a coloring material, and a "clear ink composition" is substantially free of coloring materials. The term "substantially free of coloring materials" means that the coloring material content is 0.10% by mass or less of the total amount of the ink composition (100% by mass). The general term "ink composition" is used hereinafter where it does not matter whether the ink composition is colored or clear. Clear inks according to this embodiment are used for quality purposes, such as abrasion resistance and glossiness of resulting recordings, rather than to color a substrate. Although coloring materials may be contained, it is preferred that the coloring material content be 0.1% by mass or less, more preferably 0.05% by mass or less.

The ink set preferably includes a colored ink composition and a clear ink composition with the resin in the colored one and the wax in the clear one. Applying the colored ink composition and then the clear ink composition to a substrate under this configuration generally helps the resin aggregate and settle down toward the substrate and the wax remain on the surface side of the ink stuff.

Resin and Wax

The ink composition(s) according to this embodiment contains resin and wax. The resin gives ink compositions containing it the ability to form film when heated on a substrate, whereas the wax does not. Measures of whether the substance gives ink compositions film-forming properties include, but are not limited to, its molecular weight and melting point/glass transition temperature. For example, the resin has a weight-average molecular weight on the order of several tens of thousands, such as 10,000 or more, preferably 30,000 or more, even more preferably 50,000 or more. As for upper limit, the weight-average molecular weight of the resin is preferably 100,000 or less. The wax has a weight-average molecular weight on the order of several thousands, such as less than 10,000, preferably 8,000 or less, or 6,000 or less, or even 4,000 or less. As for lower limit, the weight-average molecular weight of the wax is preferably 1,000 or more. It is also possible to use such molecular weights as a basis to differentiate between resins and waxes.

The term "resin" refers to a substance that is a natural or synthetic, preferably synthetic, polymer that exhibits plasticity under certain conditions. The term "wax" represents an ester wax formed by a higher fatty acid and a higher monohydric or dihydric (preferably monohydric) alcohol, paraffin wax, or an olefin wax or a mixture thereof.

In this embodiment, the resin has higher aggregability than the wax. The "aggregability" is a measure of the capability of the substance to aggregate with the coagulant in the coagulant solution and is measured as the minimum amount of resin or wax required for the resin or wax to aggregate with the coagulant and settle down in solvent, with smaller amounts (hereinafter also referred to as "minimum aggregation volume (mL)") indicating higher degrees of aggregability.

When one or two or more resins or waxes are used, the minimum aggregation volume (mL) of the resins or waxes can be the average weighted by amount. In such a case, the minimum aggregation volume (mL) of the resins represents the weighted average aggregability of all resins, contained in the same or different inks. This weighted average aggregability is preferably greater than that of all waxes, contained in the same or different inks, because this makes the advantages of this embodiment outstanding. The weighted average represents the average minimum aggregation volume weighted by the mass of each resin relative to the total mass of all resins, contained in the same or different ink compositions. The same applies to waxes.

The aggregability of a resin or wax can be measured as described in Examples. The following describes the procedure in more detail. Prepare a liquid containing 0.5% by mass the resin or wax in an aqueous medium (an aqueous solution or dispersion). If no ink component interferes with checking the aggregability of the resin or wax, a test liquid may be prepared by diluting the resin- or wax-containing ink composition in water to the resin or wax content specified above. Add 0.1 mL of a 0.1 M aqueous solution of calcium acetate dropwise to 3.0 mL of the liquid and observe the liquid for 30 seconds for precipitation. Repeat the dropwise addition of 0.1 mL and observation (in a cumulative manner for the total amount of salt solution added with 0.1-mL increments) until a precipitate forms in 30 seconds. The smallest amount of salt solution at which a precipitate formed was designated the minimum aggregation volume (mL), a measure of aggregability. The minimum aggregation volume (mL) decreases with increasing aggregability of the resin or wax, and increases with decreasing aggregability of the resin or wax. The judgments on whether a precipitate forms are made through visual inspection. These checks on aggregability use a 0.1 M aqueous solution of calcium acetate. Calcium acetate is a polyvalent metal salt coagulant known to make components of ink compositions aggregate well, and this readily available salt is used to measure the aggregability of resins and waxes. In this embodiment, aggregability is compared between the resin and the wax to find which has higher aggregability. It should be, however, understood that the coagulant used in the coagulant solution according to this embodiment does not need to be calcium acetate and can be any coagulant that is as described hereinafter. As long as a coagulant and a coagulant solution as described hereinafter are used, the resin and the wax maintain a similar relationship in terms of which is more aggregable, and the advantages of this embodiment will remain.

With the resin having higher aggregability than the wax, the ink composition(s) offers superior abrasion resistance, glossiness, and even image quality (uneven solid fills) when applied to a substrate together with the coagulant solution. A presumable but not the only reason for this is as follows. The resin according to this embodiment has high aggregability compared with the wax. After the adhesion of the ink stuff to a substrate, therefore, the resin aggregates with the coagulant in the coagulant solution within the adhering ink stuff and settles down toward the substrate. The masses of the precipitate fuse and integrate together to reinforce the coating formed by the ink composition(s). The precipitate also makes the recording highly resistant to abrasion by strengthening the bond between the coating formed by the ink composition(s) and the substrate in the recording. The wax according to this embodiment has low aggregability compared with the resin. After the ink stuff reaches the substrate, therefore, more wax is on the surface side of the adhering ink stuff (the side opposite the substrate) than on the other side. The relatively high concentration of wax on the surface side of the ink stuff makes the recording highly resistant to abrasion and glossy. Furthermore, the wax also exists on the substrate side of the adhering ink stuff, although in a relatively small amount, and this fraction of wax joins the precipitate. This reinforces the coating by retarding the phase separation occurring therein, and the precipitate strengthens the bond between the coating formed by the ink composition(s) and the substrate more than would with the resin alone. Likewise, a relatively small amount of resin present on the surface side of the adhering ink stuff enhances the film-forming properties of the ink stuff. The minimum aggregation volumes of the resin and the wax are preferably, but not limited to, each independently between 0.1 and 3.0 mL, more preferably between 0.2 and 1.0 mL, even more preferably between 0.3 and 0.6 mL.

An uneven solid fill refers to a situation in which the concentration of ink varies within the region of a substrate in which the ink has been applied to cover the entire surface of the substrate.

There may be two or more resins and/or two or more waxes in the same or different ink compositions. Even when multiple resins and waxes are contained in the same or different ink compositions, the ink composition(s) according to this embodiment only needs to meet the condition that one resin and one wax satisfy the relationship that the resin has higher aggregability than the wax (relationship 1). The ink composition(s) may contain two or more resins and/or waxes that have a partner with which they satisfy relationship 1.

For the resin(s) and the wax(es), the only requirement is that at least one combination of resin and wax that satisfies relationship 1 be contained in the same or different ink compositions; the ink composition(s) may further contain a resin or wax that has no partner with which it satisfies relationship 1. Preferably, the resin(s) that has a partner wax with which it satisfies relationship 1 represents at least 50% by mass of all resins, contained in the same or different ink compositions, or otherwise the wax(es) that has a partner resin with which it satisfies relationship 1 represents at least 50% by mass of all waxes, contained in the same or different ink compositions.

For further improvements in abrasion resistance, glossiness, and film-forming properties, it is preferred that the resin and the wax satisfy relational expression (1):

$$0.1 \text{ mL} \le (W-J) \le 3.0 \text{ mL} \qquad (1)$$

In the formula, J represents the minimum aggregation volume (mL) of the resin, and W represents the minimum aggregation volume (mL) of the wax. Formula (1) therefore specifies the difference in aggregability between the resin and the wax.

For even higher abrasion resistance, glossiness, and film-forming properties, it is preferred that the (W−J) in formula (1) be 0.1 mL or more and 1.0 mL or less, more preferably 0.1 mL or more and 0.5 mL or less.

It is also preferred that the difference between the aforementioned weighted average minimum aggregation volume of resins and that of waxes satisfy the relationship specified above.

It is preferred that two or more resins with different degrees of aggregability be used. This leads to further improved abrasion resistance because in such a case the resin(s) that has a greater tendency toward precipitation generally settles down toward the substrate first, the resin(s) relatively unlikely to precipitate follows, and finally the wax, forming layers from the substrate side to the surface side of the adhering ink stuff with strong bonds therebetween. More preferably, the difference in minimum aggregation volume between one resin and another is 0.1 mL or more. The two or more resins may be contained in one ink composition or in two or more ink compositions with at least one resin in each ink composition. The difference is preferably, but not limited to, 0.5 mL or less. It is also preferred that the difference in minimum aggregation volume between one wax and another fall within such a range when the ink composition(s) contains two or more waxes.

When the two or more resins are contained in two or more ink compositions with at least one resin in each ink composition, it would be preferred that the resin(s) in colored ink composition(s) have higher aggregability than the resin(s) in clear ink composition(s), although this is not the only possible arrangement. Applying the colored ink composition(s) and then the clear ink composition(s) to a substrate leads to further improved abrasion resistance because in such a case the resin(s) in the colored ink composition(s), which have a greater tendency toward precipitation, generally settles down toward the substrate first, the resin(s) in the clear ink composition(s), which are relatively unlikely to precipitate, follows, and finally the wax, forming layers from the substrate side to the surface side of the adhering ink stuff.

The resin can be of any kind, and examples include (meth)acrylic, urethane, polyether, and polyester resins. (Meth)acrylic resins are particularly preferred.

The wax is preferably a polyolefin or paraffin resin. It is preferred that the resin and the wax be in the form of fine particles, particularly in the form of emulsions. Examples of fine particles of resins include fine particles of polyester resins (e.g., product name "VYLONAL MD-1500" of Toyobo Co., Ltd.), polyethylene resins (e.g., product name "ZAIKTHENE A" of Sumitomo Seika Chemicals Co., Ltd.), and urethane resins (e.g., product name "RESAMINE D4200" of Dainichiseika Color & Chemicals Mfg. Co., Ltd.). The inclusion of such fine particles of resin leads to less use of the coagulant solution and therefore further reduction of recording surface stickiness, uneven solid fills, and bleeds. One or a combination of two or more resins, and one or a combination of two or more waxes are used. The following provides some examples of resins and waxes by category.

Examples of (meth)acrylic resins include acrylic resin emulsions. Examples of acrylic resin emulsions include, but are not limited to, polymers of (meth)acrylic monomers such as (meth)acrylic acid and (meth)acrylates, and copolymers of (meth)acrylic monomers and (meth)acrylic and other monomers. Examples of commercially available products include, but are not limited to, MOWINYL 966A, 972, and 8055A (trade names of products of The Nippon Synthetic Chemical Industry Co., Ltd.), MICROGEL E-1002 and MICROGEL E-5002 (trade names of products of Nippon Paint Co., Ltd.), VONCOAT 4001 and VONCOAT 5454 (trade names of DIC products), SAE 1014 (a trade name of a Zeon Corporation product), SAIVINOL SK-200 (a trade name of a product of SAIDEN CHEMICAL INDUSTRY CO., LTD.), JONCRYL 7100, JONCRYL 390, JONCRYL 711, JONCRYL 511, JONCRYL 7001, JONCRYL 632, JONCRYL 741, JONCRYL 450, JONCRYL 840, JONCRYL 62J, JONCRYL 74J, JONCRYL HRC-1645J, JONCRYL 734, JONCRYL 852, JONCRYL 7600, JONCRYL 775, JONCRYL 537J, JONCRYL 1535, JONCRYL PDX-7630A, JONCRYL 352J, JONCRYL 352D, JONCRYL PDX-7145, JONCRYL 538J, JONCRYL 7640, JONCRYL 7641, JONCRYL 631, JONCRYL 790, JONCRYL 780, and JONCRYL 7610 (trade names of BASF products), and NK BINDER R-5HN (a trade name of a Shin-Nakamura Chemical product, 44% solids). The term "(meth)acrylic" as used herein includes both "methacrylic" and "acrylic."

It is particularly preferred to use at least one resin selected from the group consisting of (meth)acrylic resins and styrene-(meth)acrylic acid copolymer resins, more preferably at least one selected from the group consisting of acrylic resins and styrene-acrylic acid copolymer resins, even more preferably a styrene-acrylic acid copolymer resin. Such copolymers can be in the form of random, block, alternating, and graft copolymers. Regarding waxes, it is more preferred to use at least one selected from polyolefin and paraffin resins, even more preferably a polyolefin resin.

Examples of urethane resins include urethane resin emulsions. Any emulsion of a resin that has urethane bonds in the molecule can be used. Examples include urethane resins of polyether type, which have ether bonds in the backbone in addition to urethane bonds, urethane resins of polyester type, which have ester bonds in the backbone, and urethane resins of polycarbonate type, which have carbonate linkages in the backbone. Examples of commercially available urethane resin emulsions that are preferred from the viewpoint of the characteristics of resin emulsion described above include, but are not limited to, SANCURE 2710 (a trade name of a product of The Lubrizol Corporation), PERMARIN UA-150 (a trade name of a product of Sanyo Chemical Industries, Ltd.), SUPERFLEX 460, 470, 610, 700, and 860 (trade names of products of Dai-ichi Kogyo Seiyaku Co., Ltd.), NeoRez R-9660, R-9637, and R-940 (trade names of products of Kusumoto Chemicals, Ltd.), ADEKA BONTIGHTER HUX-380 and 290K (trade names of Adeka products), TAKELAC® W-605, W-635, and WS-6021 (trade names of products of Mitsui Chemicals, Inc.), and POLYETHER (a trade name of a product of TAISEI FINE CHEMICAL CO., LTD., $T_g=20°$ C.)

Examples of polyolefin waxes include, but are not limited to, CHEMIPEARL 5120, 5650, and S75N (trade names of products of Mitsui Chemicals, Inc.) and AQUACER 501, AQUACER 506, AQUACER 513, AQUACER 515, AQUACER 526, AQUACER 593, and AQUACER 582 (trade names of BYK products).

Examples of paraffin waxes include, but are not limited to, AQUACER 497 and AQUACER 539 (trade names of BYK products).

Examples of polyester resins include, but are not limited to, polybutylene terephthalate, polytrimethylene terephthalate, polyethylene terephthalate, polyethylene naphthalate, copolymers thereof, and fine particles thereof. Polyester resins substituted with sulfo (sulfonic acid) groups, or sulfopolyester resins (polysulfoester resins) are also preferred for use.

Examples of polyether resins are all resins that have the polyether structure.

The resin and/or the wax preferably have a functionality selected from carboxyl, sulfonic acid, and amino groups and salts thereof, particularly carboxyl or a base thereof. Such resins and waxes are generally highly stable when dispersed. In particular, resins and waxes having carboxyl or a base thereof are generally coagulable by the coagulant and therefore provide further reductions in uneven solid fills and bead-chain lines on the resulting recordings. For better dispersion stability, it is preferred that the resin and the wax be resins having an anionic functionality.

The aggregability of resin or wax generally increases with, for example, increasing number of the above listed functionalities per unit mass of the resin or wax and therefore can be adjusted by controlling the number of such functionalities in designing the resin or wax. In other words, the aggregability of resin or wax is higher with increasing acid value of the resin or wax because acid value tends to be proportional to the number of such functionalities.

If resin or wax in the form of fine particles, such as an emulsion, is used with an emulsifier, an agent for dispersing the resin or wax, the aggregability can be adjusted by using or omitting the emulsifier and controlling the emulsifier content because the aggregability of resin or wax declines with decreasing emulsifier content per unit mass of the resin or wax.

The manufacturer can design the aggregability levels of the resin and the wax in this way, check them as described above, and make feedbacks for refinements to attain the intended aggregability.

The resin preferably has a glass transition temperature ($T_g$) of −35° C. or more, more preferably 0° C. or more, even more preferably 20° C. or more, still more preferably 35° C. or more, further preferably 40° C. or more. The glass transition temperature of the resin is preferably 70° C. or less, more preferably 60° C. or less. The $T_g$ can be changed by, for example, varying the kind(s) of monomer(s) and proportions of monomers from which the resin and the wax are polymerized, polymerization parameters, and/or the type of denaturation of the resin. For example, the use of fewer polymerizable functionalities to reduce the crosslink density of the resin and the use of larger monomer(s) (monomer(s) having more carbon atoms) are possible ways to control the glass transition temperature. The polymerization parameters include polymerization temperature, the medium in which the monomer(s) is contained, the concentration of the monomer in the medium, and the polymerization initiator and catalyst and their amounts. The glass transition temperature of the resin can be measured by differential scanning calorimetry (DSC) in accordance with JIS K7121.

The wax preferably, for the prevention of poor performance as a result of excessive melting during the heating of applied ink composition(s) or subsequent drying in the recording method described hereinafter, has a melting point of 50° C. or more and 200° C. or less, more preferably 70° C. or more and 180° C. or less, even more preferably 90° C. or more and 180° C. or less.

The ink composition(s) preferably contains the resin and the wax such that they each independently represent, on a solid basis, 0.5% by mass or more and 15% by mass or less of the total amount of the ink composition(s) (100% by mass). Resin content levels in this range generally lead to a further improvement in abrasion resistance, and wax content levels in this range generally lead to more uniform formation of coatings by the ink composition(s) which provides a further improvement in abrasion resistance and glossiness.

More preferably, the resin and the wax each independently represent, on a solid basis, 0.7% by mass or more and 10% by mass or less of the total amount of the ink composition(s) (100% by mass), even more preferably 1.0% by mass or more and 5.0% by mass or less. It is particularly preferred that the resin represent 2.0% by mass or more with the wax representing 2.0% by mass or less.

It is even more preferred that all resins and/or waxes that have a partner with which they satisfy the aforementioned relationship 1 are each independently in any amount that falls within the above range with respect to the total amount of the ink composition(s) (100% by mass).

Coloring Material

The coloring material can be pigment. Examples of pigments include, but are not limited to, the following.

Examples of carbon blacks used in black inks include, but are not limited to, No. 2300, No. 900, MCF88, No. 33, No. 40, No. 45, No. 52, MA7, MA8, MA100, and No. 2200B (Mitsubishi Chemical Corporation), Raven 5750, Raven 5250, Raven 5000, Raven 3500, Raven 1255, and Raven 700 (Carbon Columbia), Regal 400R, Regal 330R, Regal 660R, Mogul L, Monarch 700, Monarch 800, Monarch 880, Monarch 900, Monarch 1000, Monarch 1100, Monarch 1300, and Monarch 1400 (CABOT JAPAN K.K.), Color Black FW1, Color Black FW2, Color Black FW2V, Color Black FW18, Color Black FW200, Color Black S150, Color Black 5160, Color Black 5170, Printex 35, Printex U, Printex V, Printex 140U, Special Black 6, Special Black 5, Special Black 4A, and Special Black 4 (Degussa).

Examples of pigments used in white inks include, but are not limited to, C.I. Pigment White 6, 18, and 21, titanium oxide, zinc oxide, zinc sulfide, antimony oxide, and zirconium oxide, and white hollow resin particles and polymer particles.

Examples of pigments used in yellow inks include, but are not limited to, C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of pigments used in magenta inks include, but are not limited to, C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:2, 48:5, 57:1, 88, 112, 114, 122, 123, 144, 146, 149, 150, 166, 168, 170, 171, 175, 176, 177, 178, 179, 184, 185, 187, 202, 209, 219, 224, and 245 and C.I. Pigment Violet 19, 23, 32, 33, 36, 38, 43, and 50.

Examples of pigments used in cyan inks include, but are not limited to, C.I. Pigment Blue 1, 2, 3, 15, 15:1, 15:2, 15:3, 15:34, 15:4, 16, 18, 22, 25, 60, 65, and 66 and C.I. Vat Blue 4 and 60.

Examples of other pigments include, but are not limited to, C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63.

Preferably, the ink set includes at least a colored ink composition with the coloring material therein incorporates one or two or more pigments selected from the group consisting of self-dispersible pigments and resin-dispersed pigments. This generally leads to excellent glossiness by ensuring uniform dispersion of the coloring material in the recordings.

In this embodiment, it is also possible to use a self-dispersible pigment and/or a polymer-dispersed pigment.

Self-dispersible pigments are pigments that have hydrophilic groups on their surface. Preferred self-dispersible pigments have at least one hydrophilic group selected from the group consisting of —OM, —COOM, —CO—, —SO$_3$M, —SO$_2$M, —SO$_2$NH$_2$, —RSO$_2$M, —PO$_3$HM, —PO$_3$M$_2$, —SO$_2$NHCOR, —NH$_3$, and —NR$_3$.

In these chemical formulae, M represents a hydrogen atom, an alkali metal, ammonium, a substituted or unsubstituted phenyl group, or an organic ammonium, and R represents a $C_1$ to $C_{12}$ alkyl group or a substituted or unsubstituted naphthyl group. M and R are selected independently of each other.

A specific process for the production of a self-dispersible pigment includes binding (grafting) such hydrophilic groups to the surface of a pigment through a physical or chemical treatment. Specific examples of such physical treatments include vacuum plasma treatment. Specific examples of such chemical treatments include wet oxidation, in which the pigment is oxidized using an oxidizing in water, and binding carboxyl groups via phenyl groups by attaching p-aminobenzoic acid to the surface of the pigment.

Polymer-dispersed pigments are pigments that are dispersible in liquids thanks to polymers. The polymer content of such a pigment can be expressed as the polymer coverage of the pigment. The polymer coverage is preferably 1.0% or more and 50% or less, more preferably 1.0% or more and 10% or less, even more preferably 1.0% or more and 5.0% or less. Polymer coverages of 1.0% or more generally lead to good dispersibility. Polymer coverages of 50% or less generally lead to a further improvement in color development, and to an even greater improvement when 5.0% or less.

It is preferred that copolymers of styrene, (meth)acrylate, and (meth)acrylic acid represent 70% by mass or more of the polymers. This generally makes the ink excellent in fixation and glossiness. More preferred copolymers are polymerized from monomeric components including a $C_1$-$C_{24}$ alkyl (meth)acrylate and/or a $C_3$-$C_{24}$ cyclic alkyl (meth)acrylate representing 50% by mass or more. Specific examples of such monomeric components include methyl (meth)acrylate, ethyl (meth)acrylate, propyl (meth)acrylate, n-butyl (meth)acrylate, isobutyl (meth)acrylate, pentyl (meth)acrylate, hexyl (meth)acrylate, 2-ethyl hexyl (meth)acrylate, octyl (meth)acrylate, nonyl (meth)acrylate, decyl (meth)acrylate, t-butyl cyclohexyl (meth)acrylate, lauryl (meth)acrylate, isobornyl (meth)acrylate, cetyl (meth)acrylate, stearyl (meth)acrylate, isostearyl (meth)acrylate, tetramethyl piperidyl (meth)acrylate, dicyclopentanyl (meth)acrylate, dicyclopentenyl (meth)acrylate, dicyclopentenyloxy (meth)acrylate, and behenyl (meth)acrylate. Examples of other monomeric components for polymerization include hydroxy (meth)acrylates, which are (meth)acrylates having hydroxy groups such as hydroxyethyl (meth)acrylate, hydroxypropyl (meth)acrylate, and diethylene glycol (meth)acrylate, urethane (meth)acrylate, and epoxy (meth)acrylate. The term "(meth)acrylate" as used herein includes both "methacrylate" and "acrylate."

The coloring material content of a colored ink composition is preferably 0.2% by mass or more and 10% by mass or less of the total amount of the ink composition(s) (100% by mass), more preferably 0.5% by mass or more and 7.5% by mass or less, even more preferably 1.0% by mass or more and 7.5% by mass or less. Coloring material content levels in these ranges generally lead to a further improvement in color development.

Clear ink compositions are substantially free of coloring materials. The coloring material content of a clear ink composition is 0.10% by mass or less to ensure glossiness, preferably 0.05% by mass or less. There is no particular lower limit; the coloring material content may be below the detection limit.

Surfactant

The ink composition(s) preferably contain a surfactant to ensure glossiness. Examples of surfactants include, but are not limited to, acetylene glycol surfactants, fluorosurfactants, and silicone surfactants.

For acetylene glycol surfactants, it is preferred to use one or more selected from, but not limited to, 2,4,7,9-tetramethyl-5-decin-4,7-diol and alkylene oxide adducts thereof and 2,4-dimethyl-5-decin-4-ol and alkylene oxide adducts thereof. Examples of commercially available acetylene glycol surfactants include, but are not limited to, OLFINE® 104 surfactants, OLFINE E1010 and other E surfactants (trade names of products of Air Products Japan, Inc.), SURFYNOL® 104, 465, 61, and DF110D (trade names of products of Nissin Chemical Industry Co., Ltd.). Acetylene glycol surfactants can be used individually or as a combination of two or more.

Examples of fluorosurfactants include, but are not limited to, perfluoroalkyl sulfonates, perfluoroalkyl carboxylates, perfluoroalkyl phosphates, perfluoroalkyl ethylene oxide adducts, perfluoroalkyl betaines, and perfluoroalkyl amine oxides. Examples of commercially available fluorosurfactants include, but are not limited to: S-144 and S-145 (Asahi Glass Co., Ltd.); FC-170C, FC-430, and FLUORAD-FC4430 (Sumitomo 3M Ltd.); FSO, FSO-100, FSN, FSN-100, and FS-300 (DuPont); and FT-250 and 251 (NEOS Co., Ltd.). Fluorosurfactants can be used individually or as a combination of two or more.

Examples of silicone surfactants include, but are not limited to, polysiloxane compounds and polyether-modified organosiloxanes. Specific examples of commercially available silicone surfactants include, but are not limited to, BYK-306, BYK-307, BYK-333, BYK-341, BYK-345, BYK-346, BYK-347, BYK-348, and BYK-349 (trade names, BYK-Chemie) and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names, Shin-Etsu Chemical). Silicone surfactants can be used individually or as a combination of two or more.

The surfactant content is preferably 0.05% by mass or more and 2.5% by mass or less of the total amount of the ink composition(s) (100% by mass), more preferably 0.1% by mass or more and 1.5% by mass or less. Surfactant content levels in these ranges generally lead to a further improvement in the wettability of the ink composition(s) on the substrate it (they) adheres to.

Solvent

The ink composition(s) may contain solvent. The solvent can be, but not limited to, an organic solvent or water for example.

Examples of organic solvents include, but are not limited to: hydrocarbon solvents such as toluene, hexane, cyclohexane, benzene, octane, and isooctane; ester solvents such as ethyl acetate, butyl acetate, and γ-butyrolactone; ketone solvents such as acetone, methyl ethyl ketone, methyl isobutyl ketone, and cyclohexanone; alcohol solvents such as methanol, ethanol, propanol, isopropanol, butanol, propylene glycol, and 1,3-butanediol; halogenated solvents such as dichloroethane and chloroform; ether solvents such as diethyl ether and tetrahydrofuran; amide solvents such as N,N-dimethylformamide, N,N-dimethylacetamide, N-methyl-2-pyrrolidone, N-ethyl-2-pyrrolidone, 2-pyrrolidone, N-methyl-ε-caprolactam, and hexamethylphosphoramide; and glycerol, triethylene glycol, triethylene glycol monobutyl ether, and water-soluble organic solvents.

The organic solvent content is preferably 0.1% by mass or more and 90% by mass or less of the total amount of the ink composition(s) (100% by mass), more preferably 1.0% by mass or more and 50% by mass or less. Organic solvent content levels in these ranges generally lead to a further improvement in the wettability of the ink composition(s) on the substrate it (they) adheres to.

The water can be, for example, water treated to minimize ionic impurities, including purified water such as ion-exchanged water, ultrafiltered water, reverse osmosis-water, and distilled water as well as ultrapure water. Sterilized water, such as ultraviolet- or hydrogen peroxide-treated water, tends to further improve storage stability by preventing fungal and bacterial development in the coagulant solution during prolonged storage.

The ink composition(s) and the coagulant solution according to this embodiment are preferably aqueous compositions, in which a major solvent component is water, because this ensures environmental capability and makes the advantages of this embodiment outstanding. The water content is preferably 40% by mass or more of the total mass of the composition(s) (coagulant solution), more preferably 50% by mass or more, even more preferably 60% by mass or more. As for upper limit, the water content is preferably 98% by mass or less.

Besides the components discussed above, the ink composition(s) may optionally contain various additives such as dissolution aids, viscosity modifiers, pH-adjusting agents, antioxidants, preservatives, antimolds, anticorrosives, and chelating agents for capturing metal ions that would affect dispersion (e.g., sodium ethylenediaminetetraacetate).

The ink composition(s) is preferably for use in ink jetting (described hereinafter) to make the advantages of the invention more effective and more consistent. For example, in the application of ink composition(s) in the recording method described hereinafter, the ink composition(s) can be used to apply it (them) to a substrate through ink jetting.

Coagulant Solution

The coagulant solution according to this embodiment contains a coagulant capable of coagulating the ink composition(s), more specifically a coagulant capable of coagulating the ink composition(s) by making a component in the ink composition(s) aggregate. The coagulant in the coagulant solution interacts with the ink composition(s) to make a component in the ink composition(s) aggregate, thereby making the ink composition(s) thicker or insoluble. This allows the ink composition(s) to be applied without interference between droplets during placement or bleeding, thereby ensuring graphics such as lines and fine patterns will be drawn uniformly. In the ink composition or each of the ink compositions at least the resin and/or the wax is coagulable by the coagulant, but there may be other coagulable components, such as a coloring material. The coagulant solution may also be referred to as reaction solution because coagulating a component in the ink composition(s) means reacting with that component to coagulate it.

Coagulant

It is preferred to use one or two or more coagulants selected from, but not limited to, the group consisting of organic acids, polyvalent metal salts, and cationic compounds. This generally provides more effective prevention of uneven solid fills and bleeds. Examples of components of the ink composition(s) coagulable by the coagulant include the pigment, resin, and wax discussed above.

Preferred organic acids include, but are not limited to, carboxylic acids, such as maleic acid, acetic acid, phosphoric acid, oxalic acid, malonic acid, and citric acid. Monocarboxylic, dicarboxylic, and carboxylic acids having more than two carboxyl groups are particularly preferred. Such carboxylic acids generally make the coagulant solution more effective in coagulating fine particles of resin and therefore make the ink composition(s) even better in color development. Organic acids can be individually or as a combination of two or more.

Preferred polyvalent metal salts include, but are not limited to, those of inorganic or organic acids because these make the advantages of the invention more effective and more consistent. Examples of such polyvalent metal salts include, but are not limited to, salts of alkaline earth metals, i.e., certain elements in Group 2 of the Periodic Table (e.g., magnesium and calcium), transition metals in Group 3 of the Periodic Table (e.g., lanthanum), earth metals, i.e., certain elements in Group 13 and subsequent groups of the Periodic Table (e.g., aluminum), and lanthanides (e.g., neodymium). Carboxylates (e.g., formates, acetates, and benzoates), sulfates, nitrates, chlorides, and thiocyanates of such polyvalent metals are preferred. It is particularly preferred to use one or two or more polyvalent metal salts selected from the group consisting of calcium or magnesium carboxylates (such as formates, acetates, and benzoates), calcium or magnesium sulfate, calcium or magnesium nitrate, calcium chloride and magnesium chloride, and calcium or magnesium thiocyanate. Polyvalent metal salts can be used individually or as a combination of two or more.

Examples of cationic compounds include, but are not limited to, cationic polymers, cationic surfactants, and water-soluble metal compounds. Preferred cationic polymers are polyethyleneimine, polydiallylamine, polyallylamine, alkylamine polymers, and those polymers with primary to tertiary amino or quaternary ammonium salt groups that are described in publications such as JP-A-59-20696, JP-A-59-33176, JP-A-59-33177, JP-A-59-155088, JP-A-60-11389, JP-A-60-49990, JP-A-60-83882, JP-A-60-109894, JP-A-62-198493, JP-A-63-49478, JP-A-63-115780, JP-A-63-280681, JP-A-1-40371, JP-A-6-234268, JP-A-7-125411, and JP-A-10-193776 because these make the advantages of the invention more effective and more consistent. For the same reason, it is preferred to use such a cationic polymer with a weight-average molecular weight of 5000 or more, more preferably 5000 to roughly 100,000. The weight-average molecular weights of cationic polymers are measured by gel permeation chromatography using polystyrene standards.

Examples of cationic surfactants include salts of compounds with cationic groups, such as quaternary ammonium salts and sulfonic acid salts.

The coagulant content is preferably 1.0% by mass or more and 20% by mass or less of the total amount of the coagulant solution (100% by mass), more preferably 2.0% by mass or more and 17.5% by mass or less, even more preferably 4.0% by mass or more and 15% by mass or less, in particular 5.0% by mass or more and 10.0% by mass or less.

Likewise, the coagulant content is preferably between 0.1 to 1 mol/L based on the total amount of the coagulant solution (1 L (liter)), more preferably between 0.2 and 0.9 mol/L, even more preferably between 0.3 and 0.8 mol/L. The unit mol/L is also denoted as M.

Coagulant content levels in these ranges generally lead to more effective prevention of uneven solid fills and bleeds.

The coagulant solution used in this embodiment may contain surfactants, organic solvents, and water of the same kinds as those used in the ink composition(s). Besides these components, the coagulant solution may optionally contain various additives such as dissolution aids, viscosity modifiers, pH-adjusting agents, antioxidants, preservatives, antimolds, anticorrosives, and chelating agents for capturing metal ions that would affect dispersion.

Recording Method

A recording method according to an inventive embodiment includes applying the ink composition(s) in an ink set according to an inventive embodiment to a substrate (application of ink composition(s)). The method further includes applying a coagulant solution to the substrate (application of coagulant solution), and the ink set may include colored and clear ink compositions.

Application of Coagulant Solution

The application of coagulant solution is applying a coagulant solution to a substrate. Examples of methods that can be used to apply the coagulant solution include, but are not limited to, roller coating, spray coating, and ink jetting, and ink jetting is particularly preferred. Applying the coagulant solution by ink jetting generally leads to smaller changes in medium surface quality and a further improvement in wet abrasion resistance.

The amount of coagulant applied to the substrate is preferably, on a solid basis, 0.01 mg/inch$^2$ or more and 1.0 mg/inch$^2$ or less, more preferably 0.01 mg/inch$^2$ or more and 0.50 mg/inch$^2$ or less, even more preferably 0.01 mg/inch$^2$ or more and 0.2 mg/inch$^2$ or less. Amounts in these ranges generally lead to further reductions in uneven solid fills and bead-chain lines on the resulting recordings.

The time interval from the end of the application of coagulant solution to the start of the application of ink composition(s) is preferably 60 seconds or less, more preferably 10 seconds or more and 60 seconds or less, even more preferably 0.10 seconds or more and 30 seconds or less, in particular 0.10 seconds or more and 10 seconds or less. Time intervals from the end of the application of coagulant solution to the start of the application of ink composition(s) of 60 seconds or less generally make the reaction between the coagulant solution and the ink composition(s) even more efficiency and therefore lead to a further improvement in the image quality of the resulting recordings. When the coating formed by the ink composition(s) is thin, short time intervals are particularly preferred.

Application of Ink Composition(s)

The application of ink composition(s) is applying ink composition(s) to the substrate. This can be performed at the same time as or before or after the application of coagulant solution, preferably after the application of coagulant solution. Examples of methods that can be used to apply the ink composition(s) include, but not limited to, roller coating, spray coating, and ink jetting, and ink jetting is particularly preferred. Applying the ink composition(s) by ink jetting generally leads to smaller changes in medium surface quality and a further improvement in wet abrasion resistance.

The application of ink composition(s) is preferably a wet-on-wet application process. The term "wet-on-wet application" as used herein refers to a process of applying two or more ink compositions meeting at least one of the following conditions: the two ink compositions reach the substrate simultaneously; the second ink composition reaches the substrate with at least 60% by mass of the volatile content of the first ink composition remaining on the substrate; or the application of the second ink composition starts in 30 seconds after the contact of the first ink composition, with the surface temperature of the substrate being 38° C. or less. When the ink set includes different ink compositions with resin in one and wax in another, wet-on-wet application generally leads to a further improvement in abrasion resistance as a consequence of uniform mixing of the applied two or more ink compositions.

The recording area to which the ink composition(s) and the coagulant solution have been applied is dried to leave a dry coating, preferably with a thickness of 0.10 to 3.0 μm, more preferably 0.10 to 2.0 μm, even more preferably 0.10 to 1.0 μm. A 0.10-μm or thicker dry coating generally gives a recording with even fewer uneven solid fills and bead-chain lines. A 3.0-μm or thinner dry coating generally gives a recording with even smaller changes in gloss. The term "recording area" refers to an area on the surface of the substrate in which the image is formed. Bead-chain lines are lines recorded with an outline that looks like a chain of beads.

It is preferred that the amount of resin applied to the substrate and that of wax be each independently, on a solid basis, 0.01 mg/inch$^2$ or more and 1.0 mg/inch$^2$ or less, more preferably 0.01 mg/inch$^2$ or more and 0.75 mg/inch$^2$ or less, even more preferably 0.02 mg/inch$^2$ or more and 0.6 mg/inch$^2$ or less, still more preferably 0.05 mg/inch$^2$ or more and 0.5 mg/inch$^2$ or less. Amounts of 0.01 mg/inch$^2$ or more generally lead to further reductions in uneven solid fills and bead-chain lines on the resulting recordings. Resin applied to a recording area in an amount of 0.75 mg/inch$^2$ or less generally makes the resulting recording even better in glossiness.

The total amount of resin and wax applied to the substrate is preferably, on a solid basis, 0.02 mg/inch$^2$ or more and 2.0 mg/inch$^2$ or less, more preferably 0.02 mg/inch$^2$ or more and 1.5 mg/inch$^2$ or less, even more preferably 0.04 mg/inch$^2$ or more and 1.2 mg/inch$^2$ or less, still more preferably 0.1 mg/inch$^2$ or more and 1.0 mg/inch$^2$ or less.

Substrate

The substrate can be, for example, an absorbent, low-absorbency, or non-absorbent substrate. It is particularly preferred to use a low-absorbency or non-absorbent substrate. When a low-absorbency or non-absorbent substrate is used, uneven solid fills and bleeds more easily occur because the surface repels the ink composition(s) and is difficult to evenly coat with the coagulant. In this embodiment, however, such substrates are particularly useful because the coagulant solution prevents the ink composition(s) from being repelled. Furthermore, the use of a low-absorbent or non-absorbent substrate generally leads to stickiness and poor wet abrasion resistance of the recording surface because the coagulant often remains on the surface of the substrate rather than penetrating to the inside, but in this embodiment such substrates are particularly useful because the use of ink composition(s) leads to less use of the coagulant solution and therefore reduced recording surface stickiness.

The term "low-absorbency substrate" or "non-absorbent substrate" refers to a substrate that absorbs 10 mL/m$^2$ or less of water in 30 msec from the start of contact in the Bristow method. The Bristow method is the most common method for rapid measurement of the amount of absorption of liquid and is endorsed by experts such as Japan Technical Association of the Pulp and Paper Industry (JAPAN TAPPI). The details of the test method can be found in Test No. 51 "Paper and Cardboard-Liquid Absorbency Test Method—the Bristow Method" of "JAPAN TAPPI Pulp and Paper Test Methods 2000."

Non-absorbent or low-absorbency substrates can be classified by their wettability of water on their recording surface. More specifically, a substrate can be characterized by putting a 0.5-μL drop of water on the recording surface of the substrate and measuring a percent decrease in contact angle (comparing the contact angle at 0.5 milliseconds post-placement with that at 5 seconds). This percent decrease is less than 1% for "non-absorbent substrates" and 1% or more and less than 5% for "low-absorbency substrates." For absorbent substrates, this percent decrease is 5% or more. The contact angle can be measured using, for example, PCA-1 portable contact angle meter (Kyowa Interface Science Co., Ltd.).

Examples of absorbent substrates include, but are not limited to, paper highly permeable to ink compositions, such as electrophotographic and other plain papers and ink jet paper (a paper dedicated for ink jet purposes, which has an ink-absorbing layer formed by silica or alumina particles or made from a hydrophilic polymer such as polyvinyl alcohol (PVA) or polyvinyl pyrrolidone (PVP)), and art papers, standard coated fine papers, and cast-coated papers, which are relatively impermeable to ink compositions and used for ordinary offset printing.

Examples of low-absorbency substrates include, but are not limited to, papers that have a surface coating to receive oil-based ink. Examples of such coated papers include, but are not limited to, printing papers such as art papers, standard coated fine papers, and matte papers.

Examples of non-absorbent substrates include, but are not limited to, plastic films that have no ink-absorbing layers and substrates composed of a base material, such as paper, and a coating or film of a plastic material bonded thereto. Examples of such plastic materials include polyvinyl chloride, polyethylene terephthalate, polycarbonate, polystyrene, polyurethane, polyethylene, and polypropylene.

Other non-ink-absorbent or low-ink-absorbency recording media can also be used, including metal plates such as iron, silver, copper, and aluminum plates and pieces of glass.

Rolled substrates are particularly preferred. In recording, a rolled substrate can be used in such a manner that the substrate is relatively scanned with a head once and wound around a reel. When such a substrate is repeatedly subjected to recording because it is impossible to record all colors in one attempt of feeding due to too many colored inks used or for other reasons, the recording can be produced through several cycles of relatively scanning the substrate with a head once and winding it around a reel. The resin layers, however, tend to easily crack because of the rolled shape of the substrate, and such cracks often affect the image quality of the resulting recording for reasons such as penetration of coagulant solution into the cracks. By contrast, coatings of ink composition(s) obtained using a recording method according to this embodiment do not easily crack. The present invention is therefore particularly useful when a substrate in such a shape is used.

Recorder

The following describes a recorder that can be used in a recording method according to this embodiment. The FIGURE is a side view that illustrates the entire schematic of an example of an ink jet recorder 1 that can be used in this embodiment. As illustrated in the FIGURE, the ink jet recorder 1 has a substrate feeder 10, a substrate transporter 20, a recording section 30, a dryer 90, and an ejector 70.

The dryer 90 includes a first drying unit 40 for drying coagulant solution and a second drying unit 50 for drying the recording produced by a recording method according to this embodiment.

The feeder 10 delivers a rolled substrate F to the transporter 20. More specifically, the feeder 10 has a rolled-substrate holder 11 that holds the rolled substrate F, and the rolled substrate F is rotated to proceed to the transport 20, which is located downstream in the direction of transport Y.

The transporter 20 in turn takes the substrate F, delivered from the feeder 10, to the recording section 30. More specifically, the transporter 20 has a first transport roller 21 so that the supplied substrate F can be taken to the recording section 30, which is located downstream in the direction of transport Y.

The recording section 30 then applies coagulant solution to the substrate F, delivered from the transporter 20, and discharges ink composition(s) to make a recording. More specifically, the recording section 30 includes heads 31 and 32 for the application of coagulant solution, a recording head 33 for the application of ink composition(s), and a platen 34 as a support for the substrate. The recording technology can be multi-pass or single-pass recording. In multi-pass recording, scanning the substrate with the heads crossing the direction of transport of the substrate alternates with transporting the substrate in the direction of transport. In single-pass recording, the substrate is continuously transported in the direction of transport with the heads staying in their positions.

The platen 34 supports the substrate F, with the supported side being the back of the substrate. The platen 34 is fitted with the first drying unit 40, which dries the coagulant solution and ink composition(s) applied to the substrate F. There is a second transport roller 43 downstream of the platen 34 in the direction of transport Y. The second transport roller 43 delivers the substrate F that has completed recording to the second drying unit 50, which is located downstream in the direction of transport Y.

The second drying unit 50 further dries the coagulant solution and ink composition(s) applied to the substrate F. There is a third transport roller 65 near the outlet 64 of the second drying unit 50. The third transport roller 65, in contact with the back of the substrate F, delivers the substrate F to the ejector 70, which is located downstream in the direction of transport Y.

The ejector 70 in turn takes the substrate F, delivered from the second drying unit 50, downstream in the direction of transport Y and ejects it out of the ink jet recorder 1. More specifically, the ejector 70 has fourth, fifth, sixth, and seventh transport rollers 71, 72, 73, and 74 and a reel 75. The fourth and fifth transport rollers 71 and 72 are in contact with the front of the substrate F. The sixth and seventh transport rollers 73 and 74 are paired rollers. The substrate F ejected by the sixth and seventh transport rollers 73 and 74 is wound around the reel 75.

Examples

The following describes an aspect of the invention in more detail by providing examples and comparative examples. No aspect of the invention is limited to these examples.

Minimum Aggregation Volumes

The minimum aggregation volume (mL) was measured on the resins and waxes used in the following. More specifically, the resin or wax was diluted with water to give a 0.5% by mass dispersion, 0.1 mL of a 0.1 M aqueous solution of calcium acetate was added dropwise to 3.0 mL of the resulting test liquid, and the liquid was observed for 30 seconds for precipitation. The dropwise addition of 0.1 mL and observation were repeated (in a cumulative manner for the total amount of salt solution added with 0.1-mL increments) until a precipitate formed in 30 seconds. The smallest amount of salt solution at which a precipitate formed was designated the minimum aggregation volume (mL), a measure of aggregability. The minimum aggregation volume (mL) decreases with increasing aggregability of the resin or wax, and increases with decreasing aggregability of the resin or wax. The judgments on whether a precipitate formed were made through visual inspection. The results are summarized along with the following kinds of resins and waxes.

Materials for the First or Second Ink Composition

The following materials were used as major ingredients for the first or second ink composition utilized in the Examples and Comparative Examples.

Pigment

Carbon black

Resins

CHEMIPEARL 5120 (a trade name of a product of Mitsui Chemicals, Inc.; minimum aggregation volume, 0.1 mL; 27% solids by mass)

CHEMIPEARL S75N (a trade name of a product of Mitsui Chemicals, Inc.; minimum aggregation volume, 0.2 mL; 25% solids by mass)

MOWINYL 8055A (a trade name of a product of The Nippon Synthetic Chemical Industry Co., Ltd.; minimum aggregation volume, 0.3 mL; 43% solids by mass)

SUPERFLEX 860 (a trade name of a product of Dai-ichi Kogyo Seiyaku Co., Ltd.; minimum aggregation volume, 0.6 mL; 40% solids by mass)

MOWINYL 972 (a trade name of a product of The Nippon Synthetic Chemical Industry Co., Ltd.; minimum aggregation volume, 3.0 mL; 50% solids by mass)

Waxes

AQUACER 526 (a trade name of a BYK Chemie product; minimum aggregation volume, 0.1 mL; 30% solids by mass)

AQUACER 593 (a trade name of a BYK Chemie product; minimum aggregation volume, 0.2 mL; 30% solids by mass)

AQUACER 582 (a trade name of a BYK Chemie product; minimum aggregation volume, 0.6 mL; 40% solids by mass)

AQUACER 539 (a trade name of a BYK Chemie product; minimum aggregation volume, 3.0 mL; 35% solids by mass)

Surfactants

BYK 348 (a trade name of a BYK Chemie product; a silicone surfactant)

SURFYNOL DF110D (a trade name of a product of Nissin Chemical Industry Co., Ltd.)

Solvents
  1,3-Butanediol
  Propylene glycol
  2-Pyrrolidone
  Water

Additives
  Triethanolamine
  Sodium ethylenediaminetetraacetate

Preparation of the First and Second Ink Compositions

First and second ink compositions were prepared by mixing materials in accordance with the formula in Table 1 and thoroughly agitating the mixture. The values in Table 1 are solid content levels in the unit of % by mass, with the total being 100.0% by mass.

TABLE 1

|  | Ink composition | 1 | 2 | 3 | 4 | 5 | 6 | 7 |
|---|---|---|---|---|---|---|---|---|
| Pigment | Carbon black | 2.0 | 2.0 | 2.0 | 2.0 | — | — | — |
| Resins | CHEMIPEARL S120 | 3.0 | — | 3.0 | — | — | — | — |
|  | CHEMIPEARL S75N | — | — | — | — | 3.0 | — | 3.0 |
|  | MOWINYL 8055A | — | — | — | 3.0 | — | — | — |
|  | SUPERFLEX 860 | — | — | — | — | — | 3.0 | — |
|  | MOWINYL 972 | — | 3.0 | — | — | — | — | — |
| Waxes | AQUACER 526 | — | — | — | — | — | 1.0 | — |
|  | AQUACER 593 | 1.0 | 1.0 | — | — | — | — | — |
|  | AQUACER 582 | — | — | — | — | 1.0 | — | — |
|  | AQUACER 539 | — | — | — | — | — | — | 1.0 |
| Surfactants | BYK 348 | 0.4 | 0.4 | 0.4 | 0.4 | 0.4 | 0.4 | 0.4 |
|  | SURFYNOL DF110D | 0.3 | 0.3 | 0.3 | 0.3 | 0.3 | 0.3 | 0.3 |
| Solvents | 1,3-Butanediol | 5.0 | 5.0 | 5.0 | 5.0 | 5.0 | 5.0 | 5.0 |
|  | 2-Pyrrolidone | 10.0 | 10.0 | 10.0 | 10.0 | 10.0 | 10.0 | 10.0 |
|  | Propylene glycol | 10.0 | 10.0 | 10.0 | 10.0 | 10.0 | 10.0 | 10.0 |
| Additives | Triethanolamine | 0.5 | 0.5 | 0.5 | 0.5 | 0.5 | 0.5 | 0.5 |
|  | Sodium ethylenediaminetetraacetate | 0.05 | 0.05 | 0.05 | 0.05 | 0.05 | 0.05 | 0.05 |
|  | Water | Balance | Balance | Balance | Balance | Balance | Balance | Balance |

Materials for Coagulant Solution

The following materials were used as major ingredients for the coagulant solutions (reaction solutions) utilized in the Examples and Comparative Examples.

Coagulants
  Magnesium sulfate

Surfactant
  BYK 348 (a trade name of a BYK Chemie product; a silicone surfactant)

Solvents
  1,3-Butanediol
  Propylene glycol
  2-Pyrrolidone
  Water

Preparation of Coagulant Solutions

Coagulant solutions were prepared by mixing materials in accordance with the formula in Table 2 and thoroughly agitating the mixture. The values in Table 2 are solid content levels in the unit of % by mass, with the total being 100.0% by mass. In reaction solutions 1 and 2, the concentration of coagulant was approximately 0.5 M.

TABLE 2

|  |  | Reaction solution 1 Amount [% by mass] | Reaction solution 2 Amount [% by mass] |
|---|---|---|---|
| Coagulant solutions | Magnesium sulfate | 6.0 | — |
|  | Calcium acetate | — | 7.9 |
| Surfactant | BYK 348 | 0.4 | 0.4 |
| Solvents | 1,3-Butanediol | 5.0 | 5.0 |
|  | 2-Pyrrolidone | 10.0 | 10.0 |
|  | Propylene glycol | 18.0 | 18.0 |
|  | Water | Balance | Balance |

Production of Recordings

PX-G930 (a trade name of an Epson printer) was loaded with a substrate, and a coagulant solution (reaction solution) filled in a head was applied by ink jetting at a resolution of 720×720 dpi in an amount of 1.7 mg/inch$^2$. A first ink composition filled in a head was then applied to the surface of the substrate, with the coagulant solution adhering thereto, by ink jetting at a resolution of 720×720 dpi in an amount of 7 mg/inch$^2$. In those Examples and Comparative Examples in which a second ink composition was used, the second ink composition was then applied from a head to the surface, with the ink composition adhering thereto, by ink jetting at a resolution of 720×720 dpi in an amount of 2 mg/inch$^2$. A recording was obtained on the substrate in this way. The surface temperature of the substrate was maintained at 25° C. during application. The second ink composition, in those Examples and Comparative Examples in which it was used, was applied wet on wet. After application and ejection from the printer, the substrate was dried by simply placing it at 60° C. for 10 minutes. The substrate was a standard coated fine paper ("Elitel Cast 73," a trade name of a product of Daio Paper Corporation). Table 4 summarizes the individual and weighted average minimum aggregation volumes of resins and waxes for the ink compositions used in the Examples and Comparative Examples.

Image Quality (Uneven Solid Fills)

A recording was obtained in the same way as in the foregoing Production of Recordings, except that a 10×10 mm solid pattern was drawn. The recording was visually inspected for uneven solid fills, and the image quality (uneven solid fills) was assessed against the criteria below. The results are presented in Table 3.

Criteria

⊙: No unevenness (apparently irregular coloring with the inks) inside the pattern ○: Although with no great irregularities, the inside of the pattern is slightly uneven (small irregularities)

Δ: Significant unevenness (great irregularities) inside of the pattern Abrasion Resistance The recording was rubbed with a friction finger of AB-301 Color Fastness Rubbing Tester (a trade name of a Tester Sangyo product) with cotton adjacent fabric (JIS L0803) under a load of 300 g until peeling or 30 to-and-fro strokes. The recording on the substrate was visually inspected for peeling, and the abrasion resistance was assessed against the criteria below. The results are presented in Table 3.

Criteria

⊙: The recording did not peel off during the 30 strokes

○: The recording peeled off between the 20th and 29th strokes

Δ: The recording peeled off between the 10th and 19th strokes x: The recording peeled off within 9 strokes Glossiness The 60° gloss of the recording was measured using GM-268Plus Gloss Meter (a trade name of a Konica Minolta product), and the glossiness was assessed against the criteria below. The results are summarized in Table 3.

Criteria

⊙: 84 or more

○: 60 or more and less than 84

Δ: 45 or more and less than 60 x: Less than 45

TABLE 3

|  | Example 1 | Comparative Example 1 | Example 2 | Example 3 | Comparative Example 2 | Example 5 | Example 4 | Example 6 |
|---|---|---|---|---|---|---|---|---|
| First ink composition | Ink composition 1 | Ink composition 2 | Ink composition 3 | Ink composition 4 | Ink composition 3 | Ink composition 1 | Ink composition 1 | Ink composition 1 |
| Second ink composition | — | — | Ink composition 5 | Ink composition 5 | Ink composition 6 | Ink composition 5 | Ink composition 7 | Ink composition 6 |
| Reaction solution | Reaction solution 1 | Reaction solution 1 | Reaction solution 1 | Reaction solution 1 | Reaction solution 1 | Reaction solution 1 | Reaction solution 1 | Reaction solution 1 |
| Image quality (uneven solid fills) | ⊙ | Δ | ⊙ | ○ | ⊙ | ⊙ | ⊙ | ⊙ |
| Abrasion resistance | ○ | Δ | ⊙ | ○ | Δ | ⊙ | ○ | ○ |
| Glossiness | ○ | Δ | ○ | ○ | Δ | ○ | ⊙ | Δ |

|  | Comparative Example 3 | Comparative Example 4 | Comparative Example 5 | Example 7 | Example 8 |
|---|---|---|---|---|---|
| First ink composition | Ink composition 2 | Ink composition 3 | Ink composition 1 | Ink composition 1 | Ink composition 3 |
| Second ink composition | Ink composition 6 | — | — | — | Ink composition 2 |
| Reaction solution | Reaction solution 1 | Reaction solution 1 | — | Reaction solution 2 | Reaction solution 1 |
| Image quality (uneven solid fills) | Δ | ⊙ | Δ | ⊙ | ○ |
| Abrasion resistance | Δ | X | ⊙ | ○ | Δ |
| Glossiness | Δ | Δ | ⊙ | ○ | Δ |

TABLE 4

| Minimum aggregation volume (mL) | Example 1 | Comparative Example 1 | Example 2 | Example 3 | Comparative Example 2 | Example 5 | Example 4 | Example 6 |
|---|---|---|---|---|---|---|---|---|
| First ink composition (resin) | 0.1 | 3.0 | 0.1 | 0.3 | 0.1 | 0.1 | 0.1 | 0.1 |
| First ink composition (wax) | 0.2 | 0.2 | — | — | — | 0.2 | 0.2 | 0.2 |
| Second ink composition (resin) | — | — | 0.2 | 0.2 | 0.6 | 0.2 | 0.2 | 0.6 |
| Second ink composition (wax) | — | — | 0.6 | 0.6 | 0.1 | 0.6 | 3.0 | 0.1 |
| Weighted average (resins) | 0.1 | 3.0 | 0.05 | 0.25 | 0.35 | 0.15 | 0.15 | 0.35 |
| Weighted average (waxes) | 0.2 | 0.2 | 0.6 | 0.6 | 0.1 | 0.4 | 1.6 | 0.15 |

| Minimum aggregation volume (mL) | Comparative Example 3 | Comparative Example 4 | Comparative Example 5 | Example 7 | Example 8 |
|---|---|---|---|---|---|
| First ink composition (resin) | 3.0 | 0.1 | 0.1 | 0.1 | 0.1 |
| First ink composition (wax) | 0.2 | — | 0.2 | 0.2 | — |
| Second ink composition (resin) | 0.6 | — | — | — | 3.0 |

TABLE 4-continued

| | | | | | |
|---|---|---|---|---|---|
| Second ink composition (wax) | 0.1 | — | — | — | 0.2 |
| Weighted average (resins) | 1.8 | 0.1 | 0.1 | 0.1 | 1.55 |
| Weighted average (waxes) | 0.15 | — | 0.2 | 0.2 | 0.2 |

As can be seen from the results, Examples 1 to 8 were superior in image quality and abrasion resistance. In these Examples, an ink composition contained resin and wax together or two ink compositions contained resin and wax separately, the resin had higher aggregability than the wax, and the ink composition or compositions were used with coagulant solution.

In Examples 1 and 7, one ink composition was used containing wax and a resin having higher aggregability than the wax together. This configuration leads to superior image quality and abrasion resistance.

In Example 8, two ink compositions contained wax and resins having higher aggregability than the wax separately. This configuration also leads to superior image quality and abrasion resistance.

In Examples 2 and 3, one of the two ink compositions used contained wax and a resin having higher aggregability than the wax together. This configuration also leads to superior image quality and abrasion resistance.

In Examples 4 and 5, each of the two ink compositions used contained wax and a resin having higher aggregability than the wax together. This configuration provides superior glossiness as well as outstanding image quality and abrasion resistance.

Example 6 revealed that when two ink compositions are used, the resulting recordings have superior image quality and abrasion resistance when at least one of the ink compositions contains wax and a resin having higher aggregability than the wax together. As can be seen by comparing Examples 1 and 6, the advantages of the invention are outstanding when resins, contained in the same or different ink compositions, have a higher weighted average aggregability than waxes because this configuration adds superior glossiness.

By contrast, Comparative Examples 1 to 5 were inferior in image quality or abrasion resistance. The ink composition or compositions used in these Comparative Examples contained no combination of resin and wax in which the resin had higher aggregability than the wax or were applied without coagulant solution.

The entire disclosure of Japanese Patent Application Nos. 2015-242615, filed Dec. 11, 2015 and 2016-220243, filed Nov. 11, 2016 are expressly incorporated by reference herein.

What is claimed is:

1. An ink set comprising:
   two ink compositions containing resin and wax separately, with the resin in one of the ink compositions and the wax in the other, or an ink composition containing resin and wax together; and
   a coagulant solution containing a coagulant for a component of the ink composition or compositions,
   wherein the resin has higher aggregability than the wax,
   wherein the resin and the wax satisfy relational expression (1):

$$0.1 \text{ mL} \leq (W-J) \leq 3.0 \text{ mL} \quad (1)$$

where J represents a minimum aggregation volume, mL, of the resin, and W represents a minimum aggregation volume, mL, of the wax.

2. The ink set according to claim 1, wherein the ink composition or each of the ink compositions is a colored ink composition, which is an ink composition further containing a coloring material, or a clear ink composition.

3. The ink set according to claim 2, wherein the ink set includes the two ink compositions containing resin and wax separately, the resin-containing ink composition is the colored ink composition, and the wax-containing ink composition is the clear ink composition.

4. The ink set according to claim 2, wherein:
   the ink set includes at least the colored ink composition; and
   the coloring material in the colored ink composition contains at least one of a self-dispersible pigment and a resin-dispersed pigment.

5. The ink set according to claim 1, wherein the ink composition or compositions contain two or more resins with different degrees of aggregability.

6. The ink set according to claim 1, wherein the coagulant is an organic acid, a polyvalent metal salt, or a cationic compound.

7. The ink set according to claim 1, wherein the ink composition or compositions are used by applying the ink composition or compositions to a recording medium through ink jetting.

8. The ink set according to claim 1, wherein the ink composition or compositions contain the resin and the wax such that the resin and the wax each independently represent, on a solid basis, 0.5% by mass or more and 15% by mass or less of a total amount of the ink composition or compositions.

9. The ink set according to claim 1, wherein the resins in the ink composition or compositions have a higher weighted average aggregability than the waxes in the ink composition or compositions.

10. A recording method comprising applying the ink composition or compositions in an ink set according to claim 1 to a substrate and applying the coagulant solution in the ink set to the substrate.

11. A recording method comprising applying the ink composition or compositions in an ink set according to claim 2 to a substrate and applying the coagulant solution in the ink set to the substrate.

12. A recording method comprising applying the ink composition or compositions in an ink set according to claim 3 to a substrate and applying the coagulant solution in the ink set to the substrate.

13. A recording method comprising applying the ink composition or compositions in an ink set according to claim 4 to a substrate and applying the coagulant solution in the ink set to the substrate.

14. A recording method comprising applying the ink composition or compositions in an ink set according to claim 5 to a substrate and applying the coagulant solution in the ink set to the substrate.

15. A recording method comprising applying the ink composition or compositions in an ink set according to claim 6 to a substrate and applying the coagulant solution in the ink set to the substrate.

16. A recording method comprising applying the ink composition or compositions in an ink set according to claim 7 to a substrate and applying the coagulant solution in the ink set to the substrate.

17. The recording method according to claim 10, wherein the ink compositions include an ink composition containing wax and an ink composition containing resin, the resin having higher aggregability than the wax.

18. The recording method according to claim 17, wherein the application of the ink composition or compositions is a wet-on-wet application process.

* * * * *